Jan. 31, 1939.     B. P. BAGBY     2,145,243
METHOD OF TREATING WHISKY
Filed Nov. 2, 1937
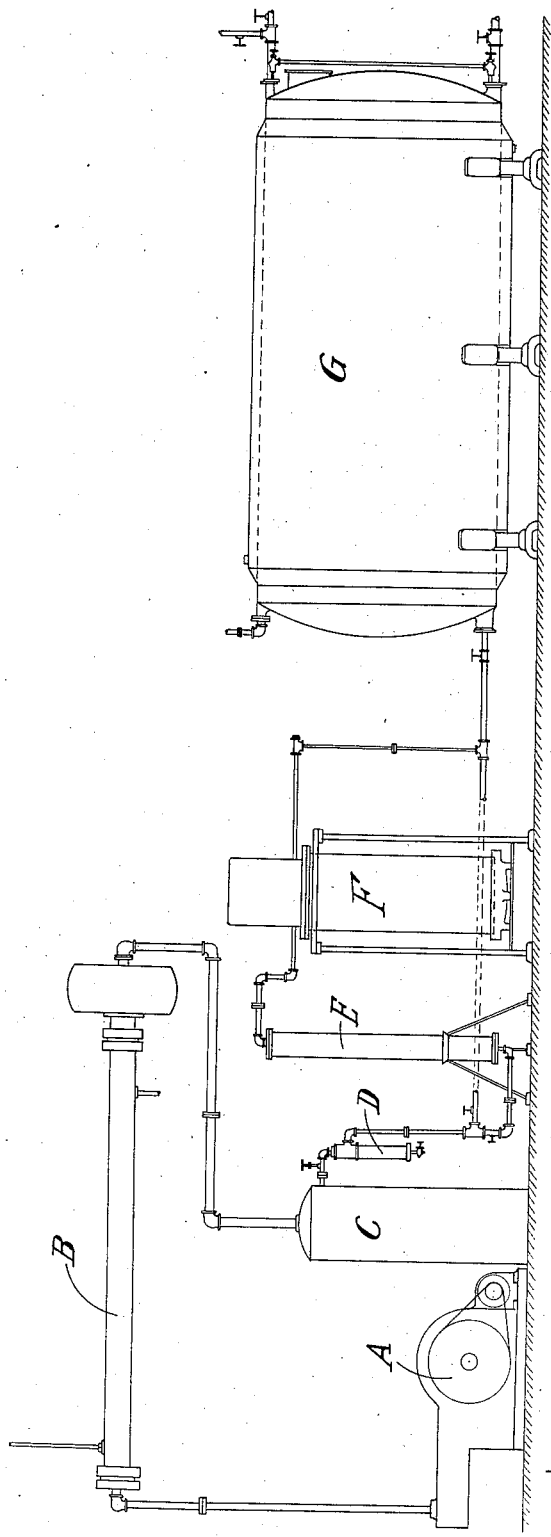
INVENTOR.
BEN P. BAGBY
BY Richey Watts
ATTORNEYS Patented Jan. 31, 1939

2,145,243

UNITED STATES PATENT OFFICE 2,145,243

METHOD OF TREATING WHISKY

Ben P. Bagby, Louisville, Ky., assignor to Ageing Laboratories, Inc., Louisville, Ky., a corporation of Ohio Application November 2, 1937, Serial No. 172,400

9 Claims. (Cl. 99—48)

This invention relates to the art of treating whisky made from grain and is particularly concerned with the curing and ageing of new or so-called "green whisky", i. e., whisky as it comes from the still. More especially, this invention is concerned with a new and novel method for accomplishing, in a few days, the curing and ageing of new or green whisky made from grain which has heretofore required several years' time.

New or green whisky made from grain possesses a distinct odor characteristic of freshly distilled whisky; contains small amounts of aldehydes; larger amounts of esters, extracts and acids; and does not possess the aroma, flavor, taste, color, bouquet or palatability desired or commonly obtained after years of curing and ageing.

New or green whisky has been cured or aged, heretofore, usually by being kept in charred wood containers for several years. During that time the whisky gradually changes in nature and composition. The disagreeable odors disappear, the aldehyde, ester extract and acid contents each increase from three to five hundred percent, the body becomes heavier and the permanency and quality of the bead is improved. The whisky becomes dark reddish in color and acquires distinct and desired taste, flavor, aroma, bouquet and palatability.

Many efforts have been made to shorten the time heretofore commonly required for curing and ageing whisky made from grain, but so far as I am aware, none of these efforts has met with much success commercially.

By the present invention I am able, within a few days' time, to convert green whisky into cured and aged whisky which in all respects is as good as, and in some respects is better than, similar whisky cured and aged in the usual manner for four or five years.

The present method may be briefly described as follows:—Ozonized air, under pressure, is passed thru and agitates new or green whisky for a short time, for example, a few hours. This treatment is referred to herein as the "curing" step. Then the "cured" whisky is preferably subjected repeatedly to agitation and to high and low pressures, in the presence of charred or toasted white oak, for a longer time, for example, a few days. This treatment of the "cured" whisky is referred to herein as the "ageing" step.

Reference to the drawing, accompanying and forming a part of this specification, will better enable those skilled in the art to understand the present invention.

In the accompanying drawing, the figure shows, diagrammatically, one form of apparatus for carrying out the present method.

In the figure, the air compressed by compressor A passes successively thru an air cooler B, wherein it is cooled; a tank C; a filter D which removes dust, dirt, lint and other solid particles therefrom; a dehydrator E, which may, for example, contain calcium chloride or other dehydrant and which serves to remove substantially all moisture from the compressed air passing therethru; an ozonizer F which converts some of the oxygen of the air into ozone; and into the lower part of tank G which contains the whisky to be treated and which has a gas outlet near its top. Air escaping from tank G may be passed thru a scrubber (not shown) to recover any alcohol carried over as vapor.

In carrying out the present process, with the equipment shown in the drawing, new or green grain whisky and pieces of charred white oak are charged into tank G. The temperature of the whisky is brought to between about 80° F. and about 85° F. The pieces of charred oak are preferably between about ½" and ¾" thick but may be of any convenient length and width. They should be charred to the extent of about ⅛" deep on each surface. An aggregate of about 100 sq. in. of surface per gallon of whisky is sufficient. Then air compressed by compressor A to a pressure of about 50 lbs. per sq. in., is cooled to between about 80° and 85° F. in cooler B; is filtered in filter D; is dehydrated in dehydrator E; is ozonized in ozonizer F and is released near the bottom of tank G so as to bubble up thru and agitate the whisky and escapes thru the gas outlet near the top of the tank. This procedure is continued for about one and one-half to two hours, or until the whisky has been suitably "cured". This curing step removes all objectionable odors and tastes, reduces the aldehydes to a trace, increases the esters, acids and fusel oils and purifies the whisky, thereby producing a sweet and palatable cured whisky. This curing step has cured the whisky to the same extent as if it had been cured in a barrel for four years or more.

Then the current to the ozonizer is shut off and the air outlet from the tank G is closed, with the result that the compressed air agitates the whisky and charred wood therein and the pressure on the whisky is increased to that of the compressed air. Then the gas outlet near the top of the tank is opened so that the pressure drops to approximately atmospheric pressure. These steps of agitation, compression and release of pressure are repeated. If desired, the pressure may be maintained for short or long periods of time. This procedure is continued for from about thirty to fifty hours, or until the whisky has been suitably "aged".

The ageing step extracts from the wood the properties and substances that give color, taste, aroma, flavor and bouquet to the whisky and increases the amount of extracts, thereby converting the sweet, palatable, "cured", green whisky into aged whisky which is equivalent to whisky which has been aged in barrels for four years or more.

The charred wood is charged into tank G before the start of the "curing" step largely because it is more convenient to do so at that time rather than after completion of the "curing step". The charred wood is used mainly for "ageing" and hence need be used only during that step. This fact makes it possible to carry out the "ageing" step in apparatus separate from the "curing" apparatus. For example, the apparatus of the drawing may be used solely for "curing", and other apparatus including an air compressor, a cooler, a filter and a tank, all of which may be like those units as above described, may be used for "ageing" the "cured" whisky. In such case, the whisky would be treated with ozone in the absence of charred wood, and then such "cured" whisky would be transferred to the other tank, and "aged" in the presence of the charred wood. Such a procedure is adapted to large scale production and efficient use of apparatus for one "curing" device can "cure" as much whisky as several "ageing" devices can "age", due to the difference in curing and ageing times. I therefore contemplate curing whisky in one curing apparatus and ageing it in several ageing apparatuses.

Whiskies made from any kind of the usual grains or combinations of various grains may be cured and aged satisfactorily by this process.

The present process may be practiced with many variations from the manner above described. The temperature of the whisky and compressed air may vary somewhat, but should not exceed a maximum of about 100° F. In general, if the temperature should exceed about 100° F., it would shorten the time required but it would increase the amount of total acids, including acetic acid, and this would offset any advantages which might result from the higher temperatures and shorter time.

The compressed and cooled air is preferably filtered to remove all the foreign solid materials therefrom and thus to prevent contamination of the whisky with such materials. The air is preferably dehydrated before it reaches the ozonizer to prevent the formation of oxides and acids of nitrogen during ozonization and also to protect the ozonizer from corrosion.

The pressure of the air being ozonized may vary over a wide range, for example, from atmospheric pressure to pressures of 150 lbs. per sq. in. or more. Since the curing time is controlled to some extent by the amount of ozone in the ozonized air, there is an advantage in ozonizing the air at higher pressures because it contains more oxygen per cubic foot than air ozonized at lower pressures. Since pressures between about 30 lbs. and 90 lbs. per sq. in. are fairly easy to handle and supply enough ozone to cure grain whisky in a few hours' time, there is no particular advantage in using air ozonized at the higher pressures.

It is to be noted that the tank G should be so constructed as to prevent contact of the whisky therein with any metal parts which might contaminate or affect it in any undesired respect. A metal tank completely lined with glass or enamel, with all the connections being tinned, has been found to be satisfactory.

The application of relatively high and low pressures to the whisky and wood during the ageing step may be accomplished in various ways, as will be understood by those skilled in the art. However, I prefer to use air which has been compressed to between about 30 and 150 lbs. pressure per sq. in., or more, and which has been cooled to approximately the temperature of the whisky filtered, but not ozonized. With such air at a pressure of about 90 lbs. per sq. in., I have been able to age whisky in about thirty-two hours' time, while lower pressures have required approximately fifty hours. It is not essential that pressures of over 30 lbs. per sq. in. be used, for the ageing will take place at lower pressures. In general, the time for ageing varies inversely with the pressure. With low pressures the time required is longer than with higher pressures. Accordingly, I may use air at about atmospheric pressure if desired.

I believe that when the whisky and wood are subjected to such relatively high pressures, the whisky is forced into the interstices of the charred wood and possibly into the uncharred wood and that when the pressure is reduced to a relatively low pressure, the whisky tends to flow out of the wood, carrying with it color and other substances. When compressed air is again released in the whisky, it thoroughly agitates the whisky and mixes the portions which had penetrated into, and come out of, the wood with other portions thereof and thus makes the composition of the whisky homogenous and uniform throughout. The lower pressure need not be atmospheric pressure, for lower than atmospheric pressures obtained by vacuum may be used. The important object is to age the whisky and it can be accomplished more quickly and effectively by employing pressures which are far apart. There is this advantage of agitation and mixing in using compressed air during the ageing step over that of simple storage or applying pressure mechanically or by other means.

The ageing step may be carried out by simply storing the "cured" whisky in charred white oak containers until it has aged. This procedure is slow but still saves several years' time over that required by the usual practice where both curing and ageing take place in such a container. In other words, I may save two or three years' time by curing green whisky as herein described and then ageing it in charred containers and such procedure is part of the present invention.

The following table shows analyses of whisky before and after treatment by the present process:—

|  | Proof | Color | Extracts | Total acid | Esters | Aldehydes | Furfural | Fusel oil |
|---|---|---|---|---|---|---|---|---|
| Green whisky* | 103.0 | -------- | 32.7 | 14.4 | 29.0 | 4.1 | No test | 112.6 |
| Cured and aged by this process* | 98.9 | -------- | 268.0 | 53.3 | 88.4 | Trace | No test | 186.5 |

*Grams per 100 liters of 100 proof spirits.

For comparative purposes the following table gives the corresponding analyses of similar whiskies, taken from reports of Government analyses of 31 samples of whisky stored in charred barrels in a bonded warehouse over a period of eight years. These analyses are shown in Leach's "Food Inspection and Analysis", 4th ed. 1920, published by John Wiley & Son, of New York city:—

|  | Proof | Color | Extracts | Total acid | Esters | Aldehydes | Furfural | Fusel oil |
|---|---|---|---|---|---|---|---|---|
| Bourbon whisky, new** | 101.0 | 0.0 | 26.5 | 10 | 17.4 | 3.2 | 0.7 | 100.9 |
| 1 yr | 101.8 | 7.1 | 99.6 | 41.1 | 28.6 | 5.8 | 1.6 | 110.1 |
| 2 yr | 102.2 | 8.6 | 126.8 | 45.6 | 40.0 | 8.4 | 1.6 | 110.1 |
| 4 yr | 104.3 | 10.8 | 151.9 | 58.4 | 53.5 | 11.0 | 1.9 | 123.9 |
| 6 yr | 107.9 | 13.1 | 185.1 | 67.1 | 64.0 | 11.9 | 1.8 | 135.3 |
| 8 yr | 111.1 | 14.2 | 210.3 | 76.4 | 65.6 | 12.9 | 2.1 | 143.5 |
| Rye whisky, 8 yr.*** | 100.2 |  | 189.8 | 92 | 81.8 | 17.5 | 3.0 | 84.9 |

**Grams per 100 liters of 90 proof spirits.
***Grams per 100 liters of 100 proof spirits.

As indicated by the foregoing tables, whisky cured and aged by the present process has higher contents of extracts, total acids and esters than whisky aged by the ordinary method for four years or more, and is thus as good as whisky aged by the usual process for that length of time. In some respects, whisky cured and aged by the present process is superior to that aged by the usual process. The aldehyde content is decreased to a very small amount, whereas it increases several hundred percent in the usual method, and the extracts, esters, total acids and fusel oil contents were all higher than those obtained by the usual method.

In addition to the foregoing changes many other changes are brought about by the present process. The undesired odors have been eliminated, the body has been increased considerably, the bead has been improved, and the whisky has acquired the desired color, taste, aroma, flavor, bouquet, purity, smoothness and palatability. The color, flavor, taste, aroma, bouquet and palatability of whisky cured and aged by this process are substantially the same as those of whisky of the same kind cured and aged by the ordinary process for about four or more years.

Although I have mentioned specifically the use of charred white oak, I have used, with some satisfaction, the so-called toasted chips of white oak but prefer to use the charred wood. The wood is charred or toasted by subjecting it to heat and hence both may be described as being "fired" wood. The term "fired" is employed herein to include both charred and toasted wood.

Having thus described my invention I wish to state that what I desire to secure by Letters Patent is defined in the appended claims.

What is claimed is:—

1. The method of treating whisky which includes the steps of curing green whisky made from grain by passing ozonized air therethru, and ageing such whisky by subjecting it to alternately high and low air pressures in the presence of charred white oak.

2. The method of treating whisky which includes the steps of curing green whisky made from grain by passing ozonized air therethru, and ageing such whisky by passing therethru air under pressure and alternately subjecting it to high and low air pressures in the presence of charred white oak.

3. The method of treating whisky which includes the steps of passing ozonized air thru green whisky made from grain until substantially all green whisky odors have been removed, and repeatedly subjecting the thus treated whisky, in the presence of charred wood, to agitation, pressure above atmospheric pressure and pressure approximating atmospheric pressure.

4. The method of treating whisky which includes the steps of passing ozonized air thru green whisky made from grain until substantially all green whisky odors have been removed, the amounts of esters, acids and extracts have greatly increased and the amounts of aldehydes have been decreased, and repeatedly subjecting the thus treated whisky in the presence of charred wood, to agitation, high pressure and atmospheric pressure.

5. The method of treating whisky which includes the steps of passing ozonized air thru green whisky, made from grain, in the presence of charred wood and thereafter repeatedly passing air under pressure thru the thus treated whisky, applying high pressure to said whisky and then reducing such pressure.

6. The method of treating whisky which includes the steps of passing ozonized air under pressure thru green whisky, made from grain, in the presence of charred white oak, and thereafter repeatedly agitating the whisky and charred wood with air, exerting higher than atmospheric pressure on the whisky and releasing the air pressure.

7. The method of treating whisky which includes the steps of passing ozonized dehydrated compressed air thru green whisky made from grain and thereafter repeatedly passing compressed air thru the whisky in the presence of pieces of white oak, charred on all surfaces and between about ½" and ¾" thick, subjecting the wood and whisky to pressure greater than atmospheric pressure and then to lower pressure.

8. The method of treating whisky which includes the steps of passing ozonized, dehydrated, compressed air thru green whisky made from grain and thereafter repeatedly passing compressed, unozonized air thru the whisky in the presence of fired wood, subjecting the whisky and wood to air under greater than atmospheric pressure, than to air under lower pressure.

9. The method of treating whisky which includes the steps of passing filtered, dehydrated, ozonized, compressed air, thru green whisky made from grain and thereafter repeatedly passing compressed and filtered but unozonized air thru the whisky in the presence of charred wood, subjecting the whisky and wood to air under greater than atmospheric pressure, and then reducing the pressure to approximately atmospheric pressure.

BEN P. BAGBY.